US008341647B2

(12) United States Patent
Tang

(10) Patent No.: US 8,341,647 B2
(45) Date of Patent: Dec. 25, 2012

(54) SYSTEM AND METHOD FOR QUERYING HISTORICAL BEAN DATA

(75) Inventor: Jian Tang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/947,942

(22) Filed: Nov. 30, 2007

(65) Prior Publication Data

US 2009/0144323 A1  Jun. 4, 2009

(51) Int. Cl.
*G06F 3/00* (2006.01)

(52) U.S. Cl. ........ 719/318; 719/320; 707/634; 707/708; 707/718; 707/736; 707/751

(58) Field of Classification Search .................. None
See application file for complete search history.

(56) References Cited

U.S. PATENT DOCUMENTS

| | | | | |
|---|---|---|---|---|
| 6,351,776 | B1* | 2/2002 | O'Brien et al. ............... | 709/245 |
| 7,013,329 | B1* | 3/2006 | Paul et al. ..................... | 709/217 |
| 2002/0049788 | A1* | 4/2002 | Lipkin et al. .................. | 707/513 |
| 2002/0073236 | A1* | 6/2002 | Helgeson et al. ............. | 709/246 |
| 2002/0133504 | A1* | 9/2002 | Vlahos et al. ............. | 707/104.1 |
| 2002/0169860 | A1* | 11/2002 | Duggan et al. ................ | 709/223 |
| 2003/0051226 | A1* | 3/2003 | Zimmer et al. ............... | 717/102 |
| 2003/0093465 | A1* | 5/2003 | Banerjee et al. .............. | 709/203 |
| 2003/0110467 | A1* | 6/2003 | Balakrishnan ................ | 717/104 |
| 2003/0135509 | A1* | 7/2003 | Davis et al. .................... | 707/100 |
| 2003/0149646 | A1* | 8/2003 | Chen et al. ...................... | 705/35 |
| 2003/0182307 | A1* | 9/2003 | Chen et al. ................ | 707/103 X |
| 2003/0208461 | A1* | 11/2003 | Messinger et al. ................ | 707/1 |
| 2003/0208486 | A1* | 11/2003 | Dettinger et al. .................. | 707/6 |
| 2004/0006550 | A1* | 1/2004 | Upton ............................... | 707/1 |
| 2004/0019669 | A1* | 1/2004 | Viswanath et al. ........... | 709/223 |
| 2004/0039728 | A1* | 2/2004 | Fenlon et al. ..................... | 707/1 |
| 2004/0068560 | A1* | 4/2004 | Oulu et al. .................... | 709/224 |
| 2004/0075690 | A1* | 4/2004 | Cirne ............................. | 345/771 |
| 2004/0194066 | A1* | 9/2004 | Frey et al. ..................... | 717/127 |
| 2005/0216488 | A1* | 9/2005 | Petrov et al. .................. | 707/100 |
| 2005/0251371 | A1* | 11/2005 | Chagoly et al. .................. | 703/1 |
| 2005/0262185 | A1* | 11/2005 | Beartusk et al. .............. | 709/202 |
| 2005/0273667 | A1* | 12/2005 | Shrivastava et al. ............ | 714/38 |
| 2008/0077598 | A1* | 3/2008 | Wilmering et al. ........... | 707/100 |

* cited by examiner

*Primary Examiner* — Andy Ho
*Assistant Examiner* — Shih-Wei Kraft
(74) *Attorney, Agent, or Firm* — Toler Law Group

(57) ABSTRACT

A computer implemented method, apparatus and program product receives user input requesting historical data associated with an entity bean, and generates event information according to the user input. The event information is stored and used to determine the historical bean data. Where so desired, the determination may involve automatically performing statistical analysis relating to the bean.

20 Claims, 2 Drawing Sheets

SYSTEM AND METHOD FOR QUERYING HISTORICAL BEAN DATA

FIELD OF THE INVENTION

The present invention generally relates to computers and computer software, and in particular, to managing Enterprise JavaBeans within an object-oriented computer program.

BACKGROUND OF THE INVENTION

In an object-oriented computing environment, objects are modules of computer code that specify the data types of a data structure. That is, objects define a set of values and allowable operations. Objects additionally specify the kinds of operations, or methods, permitted to be applied to the data structure. The data structures and methods common to all objects of a certain kind are defined by a class of the object.

Object classes referred to as enterprise beans regard reusable software components that were originally developed by International Business Machines Corporation (IBM). When written in Java programming language, such classes are referred to as Enterprise JavaBeans, or EJB's ("Enterprise JavaBeans" is a registered trademark of Sun Microsystems, Inc.).

An entity bean is a type of EJB commonly used to model actions within a business process. For example, an application developer might implement an entity bean to retrieve and perform computation on items included within a purchase order.

In this capacity, entity beans offer many advantages to a computer user. Entity beans are modules that have already been created to perform a function. Consequently, entity beans can be reused in larger applications by a process known as instantiation. Furthermore, an entity bean is a portable and platform-independent, distributed object. As such, the class and the instantiated bean objects can operate on virtually any computer. In addition, an entity bean supports introspection, so that the object-oriented computing environment may be queried about the entity bean, its properties, methods and events. Such determinations may take place while the Java program is executing, i.e., during runtime.

An entity bean has a persistent state, and includes access to a data structure or other memory. The persistence property of entity beans allows the current state of the bean to be preserved in the case of a power outage, server crash, network failure or other interruption. When an entity bean is re-instantiated, the states of previous instances are automatically restored.

While entity beans are useful for persistence considerations, they do not accommodate queries that relate to historical data, i.e., non-current, dated state data. That is, while an entity bean may contain the current state of the entity, it has no history states. Put another way, all of an EJB's history (in flight, transit) states are not tracked by the entity bean itself. For instance, an entity bean associated with CPU usage may include the current amount of CPU usage, e.g., 20%, but may not include any history of the CPU usage over the past hour or week. In another example, an EJB may include a current stock price, but will not have information regarding the average or highest price of the stock over the course of an hour.

Because such historical data can be of great value in certain circumstances, users have conventionally been relegated to creating history entity beans associated with the EJB of interest. Continuing with the above example, a user needing past stock information has to create a number of history entity beans to store historical data whenever an EJB is updated. More particularly, the user must repeatedly write the code for and populate several history entity beans within the application for a single EJB of interest. The history entity beans must then be stored in persistent memory and associated with unique keys. The user must then scan for the stored history entity beans for a time period coincident with a past hour, or other time window of interest. Once the user has retrieved all the history entity beans of interest, then the user must do manual calculations to determine any statistic, e.g., an average or projection, necessary to answer the query.

While such conventional practices provide the opportunity to arrive at the requested result, they are relatively time consuming, tedious and error prone. For instance, if the user is only interested in a statistical perspective of the history data, such as an average, a minimum, or a maximum, conventional approaches provide no automated capabilities to support the user's need. Any conventional solution places a burden on a user to manually accomplish any needed calculations.

Moreover, storing the data associated with the multiple history entity beans needed for a single entity bean can consume large amounts of memory. Conventional processes keep all the history associated with the EJB in persistence, even though only the history of the object of the EJB over the past minute may be of interest, for instance. Keeping the memory and CPU usage for an entire day, or even longer, incurs costly overhead. There is neither a way to evict the history entity beans from memory, nor to delete the history data from a backend store.

For at least these reasons, there is a need for an improved method and system for querying historical data pertaining to a bean.

SUMMARY OF THE INVENTION

The present invention provides an improved computer implemented method, apparatus and program product for querying historical data pertaining to a bean, e.g., an entity bean. More particularly, embodiments consistent with the invention may receive user input requesting historical data associated with a bean, and generate event information according to the user input. The event information may be stored and used to determine the historical data. Where so desired, the determination may involve automatically performing statistical analysis relating to the bean and using the event information. Event information typically includes data indicative of a change affecting the bean.

Aspects of the invention may automatically discard event information that is not of interest to reduce memory requirements. Event and/or historical information may be pushed to a listener in certain embodiments that are consistent with the invention, and event adapters may be generated. Aspects of the invention may configure a query language definition. Relatedly, the query language definition may be processed, e.g., parsed into a query plan.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the underlying principles of the present invention include a computer implemented method, apparatus and program product configured to receive user input requesting historical data associated with an entity bean, and to generate event information according to the user input. The event information may be stored and used to determine the historical bean data. Where so desired, the determination may involve automatically performing statistical analysis relating to the bean.

Aspects of the invention include a method and framework for supporting history queries for one or multiple entity beans in an application server. Historical data may be maintained based on queries, and provide an easy to use, efficient and modular solution for querying the historical data. Embodiments consistent with the invention may provide an EJB history query language to query the history state of an entity bean.

Aspects of the invention provide a history query engine coupled with a Structured Query Language (SQL), e.g., syntax, to allow users to query the historical data. Features of the present invention provide several benefits and advantages over traditional approaches. For instance, the historical data may be kept in memory and only data needed for the query may be kept. That is, if historical data is not used by any query, it may be automatically deleted or never retrieved. There may also be no need to write or manage a history bean. Moreover, the query syntax may provide for selection, aggregation, projection, window, and other operations. A user may consequently query the history of multiple entities or query a window of data, among other possibilities. Put another way, embodiments of the present invention may provide a perimeter configuration mechanism for users to specify statistics, all needed entries, desired window times, etc., as well as a way to handle the associated calculation algorithms for the users.

Figure 1:
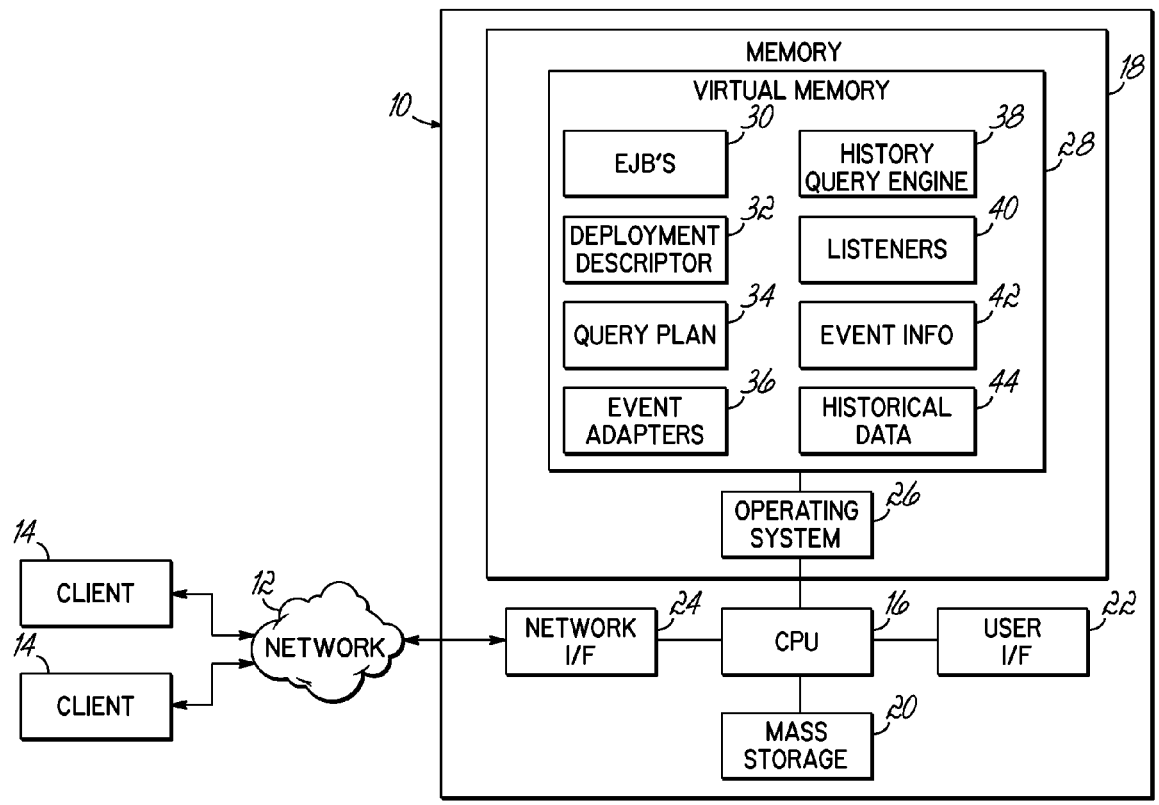
FIG. 1 shows a block diagram of a computer system configured to enable the querying of historical data that pertains to an EJB in a manner that is consistent with the principles of the present invention.

Turning now to the Drawings, wherein like numbers denote like parts throughout the several views, FIG. 1 illustrates an exemplary apparatus, or a computer 10, within which a query regarding historical data that concerns an EJB 30 may be performed. The computer 10 in the illustrated embodiment is implemented as a server or multi-user computer system that is coupled via a network 12 to one or more client computers 14. For the purposes of the illustrated embodiment, each computer 10, 14 may represent practically any type of computer, computer system or other programmable electronic device. Moreover, each computer 10, 14 may be implemented using one or more networked computers, e.g., in a cluster or other distributed computing system. In the alternative, history bean queries consistent with the invention may be implemented within a single computer or other programmable electronic device, such as a desktop computer, a laptop computer, a handheld computer, a cell phone, a set top box, a non-networked, standalone configuration, etc.

The computer 10 typically comprises a central processing unit 16 that includes at least one microprocessor coupled to a memory 18. Memory 18 may represent the random access memory (RAM) devices comprising the main storage of the computer 10, as well as any supplemental levels of memory: cache memories, non-volatile or backup memories (programmable or flash memories), read-only memories, etc. In addition, memory 18 may be considered to include memory storage physically located elsewhere in the computer 10, e.g., any cache memory in a processor in CPU 16, as well as any storage capacity used as a virtual memory, as stored on a mass storage device 20 or on another computer coupled to the computer 10.

The computer 10 also typically receives a number of inputs and outputs for communicating information externally. For interface with a user or operator, the computer 10 typically includes a user interface 22 incorporating one or more user input devices (e.g., a keyboard, a mouse, a trackball, a joystick, a touchpad, and/or a microphone, etc.) and a display (e.g., a CRT monitor, an LCD display panel, and/or a speaker, etc.) Otherwise, user input may be received via another computer or terminal.

For additional storage, the computer 10 may also include one or more mass storage devices 20, such as a floppy or other removable disk drive, a hard disk drive, a direct access storage device (DASD), an optical drive (a CD drive, a DVD drive, etc.), and/or a tape drive, among others. Furthermore, the computer 10 may include an interface 24 with one or more networks 12 (e.g., a LAN, a WAN, a wireless network, and/or the Internet, and so on) to permit the communication of information with other computers and electronic devices. It should be appreciated that the computer 10 typically includes suitable analog and/or digital interfaces between CPU 16 and each of components 18, 20, 22 and 24 as is well known in the art. Other hardware environments are contemplated within the context of the invention.

The computer 10 operates under the control of an operating system 26 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the computer 10 via network 12, e.g., in a distributed or client-server computing environment, whereby the processing required to implement the functions of a computer program may be allocated to multiple computers over a network.

A runtime environment, which in FIG. 1 takes the form of a Java Virtual Machine (JVM) 28, includes EJB's 30, a deployment descriptor 32, a query plan 34, event adaptor(s) 36, a history engine 38, a listener(s) 40, event information 42, and historical data 44 associated with one or more of the EJB's 30.

In general, a virtual machine is an abstract computing machine. Instructions to a physical machine ordinarily conform to the native language of the hardware, itself. In other cases, the instructions control a software-based computer program referred to as the virtual machine, which in turn, controls the physical machine. Instructions to a virtual machine ordinarily conform to the virtual machine language. For instance, bytecodes represent a form of the program recognized by the JVM 28, i.e., virtual machine language. As known by one of skill in the art, the JVM 28 is only one of many virtual machines. Most any interpreted language used in accordance with the underlying principles of the present invention may be said to employ a virtual machine. The MATLAB program, for example, behaves like an interpretive program by conveying the user's instructions to software written in a high-level language, rather than to the hardware.

As discussed herein, EJB's 30 generally compromise reusable software components. A container of the EJB 30, e.g., an entity EJB, may persist the state of the EJB 30 into backend stores, such as databases, file systems and other data structures of mass storage 20. The container typically provides an interface between the EJB 30 and a server or other computer 10. The container may provide many low level services, including threading and transaction support. For instance, the container may manage data storage and retrieval for the EJB's within.

As used herein, a reusable object-oriented class may be referred to as a bean, even if the class may not strictly qualify as an EJB. The term "bean" may be used herein more generally than the term is used in Java, and will include but not be limited to Javabeans.

The deployment descriptor 32 may compromise a component of the JVM 28 and may describe how an application should be deployed. More particularly, the deployment descriptor 32 may direct a deployment tool to deploy an EJB 30 with specific container options. The deployment descriptor 32 may additionally describe specific configuration requirements to be resolved. The deployment descriptor 32 may be used to describe the EJB's runtime behavior to the container. The deployment descriptor 32 may additionally allow the transaction, persistence and authorization security behavior of an EJB to be defined using declarative attributes. The Extensible Markup Language (XML) is commonly used for the syntax of the deployment descriptor 32. XML is a general purpose markup language that allows users to define their own tags.

A query plan 34, or query execution plan, may comprise a set of steps used to access information in a SQL relational database management system. Originally developed by IBM, SQL provides an interface with which to make queries into databases and information systems.

An event adaptor 36 typically compromises a process that monitors an EJB 30 for events. When an event adaptor 36 receives information 42 from its EJB 30, the event adaptor 36 may forward the information 42 to memory 18 for storage. The history engine 38 may subsequently search the memory 18 using the history engine 38. In some embodiments consistent with the invention, the event adaptor 36 may additionally discard information instead of forwarding it to the history engine 38 for processing.

An EJB 30 may define one or more events. An event may comprise a pre-defined action or occurrence that happens in or to the EJB 30. Event information 42 may relate to a user's interaction with a Java-based GUI, a reading on a remote sensor, or the expiration of a timer.

The EJB 30 may send messages, or "fire the event," to other Java objects that have registered an interest in that event. A class of Java objects may register an interest in an event by implementing an interface called a listener 40. Conversely, the listener 40 may compromise an object interested in being notified about generated events that relate to the EJB 30. The class that implements a listener 40 may then perform one or more functions in reaction to the bean's message, i.e., invoke methods upon occurrence of the event. Multiple listener interfaces may receive events from a single bean and different methods of the interfaces may be invoked in reaction to events.

As such, an event may compromise a message sent from an EJB 30 to a client object. As described herein, an event may include an action pertaining to a bean of interest, e.g., a particular user action. Rather than the computer 10 actively collecting user generated events, the computer 10 may run a notify program when an event of interest occurs. Programs that handle user interaction in this fashion are said to be event driven. An event class of the EJB 30 may enable event driven processes.

In general, the routines executed to implement the embodiments of the invention, whether implemented as part of an operating system or a specific application, component, program, object, module or sequence of instructions, or even a subset thereof, will be referred to herein as "algorithms," "program code," or simply "programs." Program code typically comprises one or more instructions that are resident at various times in various memory and storage devices in a computer; when read and executed by one or more processors in a computer they cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media comprise, but are not limited to tangible, recordable type media and transmission type media. Examples of tangible, recordable type media include volatile and non-volatile memory devices, floppy and other removable disks, hard disk drives, magnetic tape, and optical disks (CD-ROMs, DVDs, etc.). Examples of transmission type media include digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
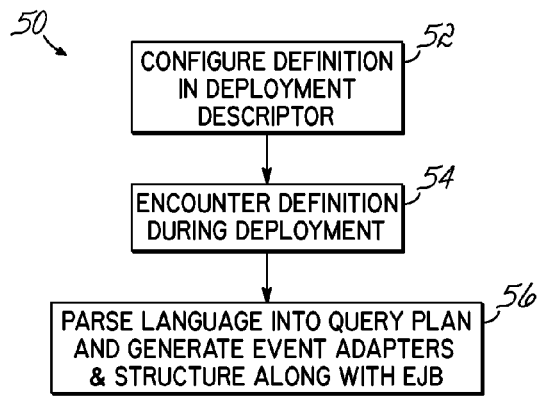
FIG. 2 shows a flowchart having steps executable by the system of FIG. 1 for deploying, or otherwise readying software, to enable EJB historical data mining in accordance with the principles of the present invention.

FIG. 2 is a flowchart 50 having steps executable by the computer system 10 of FIG. 1 for deploying EJB historical data mining. Software deployment generally comprises the activities used to make a software system available for use. In one sense, the processes of the flowchart 50 include compiling code, which may include generating code, skeletons and data structures for EJB's 30. Examples of EJB's 30 may include customer accounts, account balances, stock quotes, etc.

Turning more particularly to the processes of FIG. 2, the computer 10 may receive at block 52 a history query language definition. More particularly, an EJB history query language definition may be configured in the deployment descriptor 32.

The history query language definition may include a rule, or instruction (typically written in XML), that the deployment descriptor 32 uses to describe how an EJB 30 should be displayed.

During deployment, the deployment descriptor 32 may encounter at block 54 the definition that was configured at block 52. The encounter at block 54 may prompt the deployment descriptor 32 to begin processing the new definition.

More specifically, the computer 10 may parse at block 56 the history query language into the query plan 34. The query plan 34 may include steps used to access information in a SQL relational database management system. This step at block 56 may determine how the data should be generated, e.g., how a data structure processes the query.

Also at block 56 of FIG. 2, the computer 10 may generate history event adapters 36, as well as data structures and EJB's 30. The event adapters 36 may be configured to forward event information 42 received from EJB 30's to memory 18 for storage. That is, when an EJB 30 is updated or created, an event may be generated based upon the query definition. The query definition may ensure that the format of the event will be correct. For instance, an exemplary event comprises a time value and an identifier indicative of the purpose of the EJB 30, for example, CPU usage.

Figure 3:
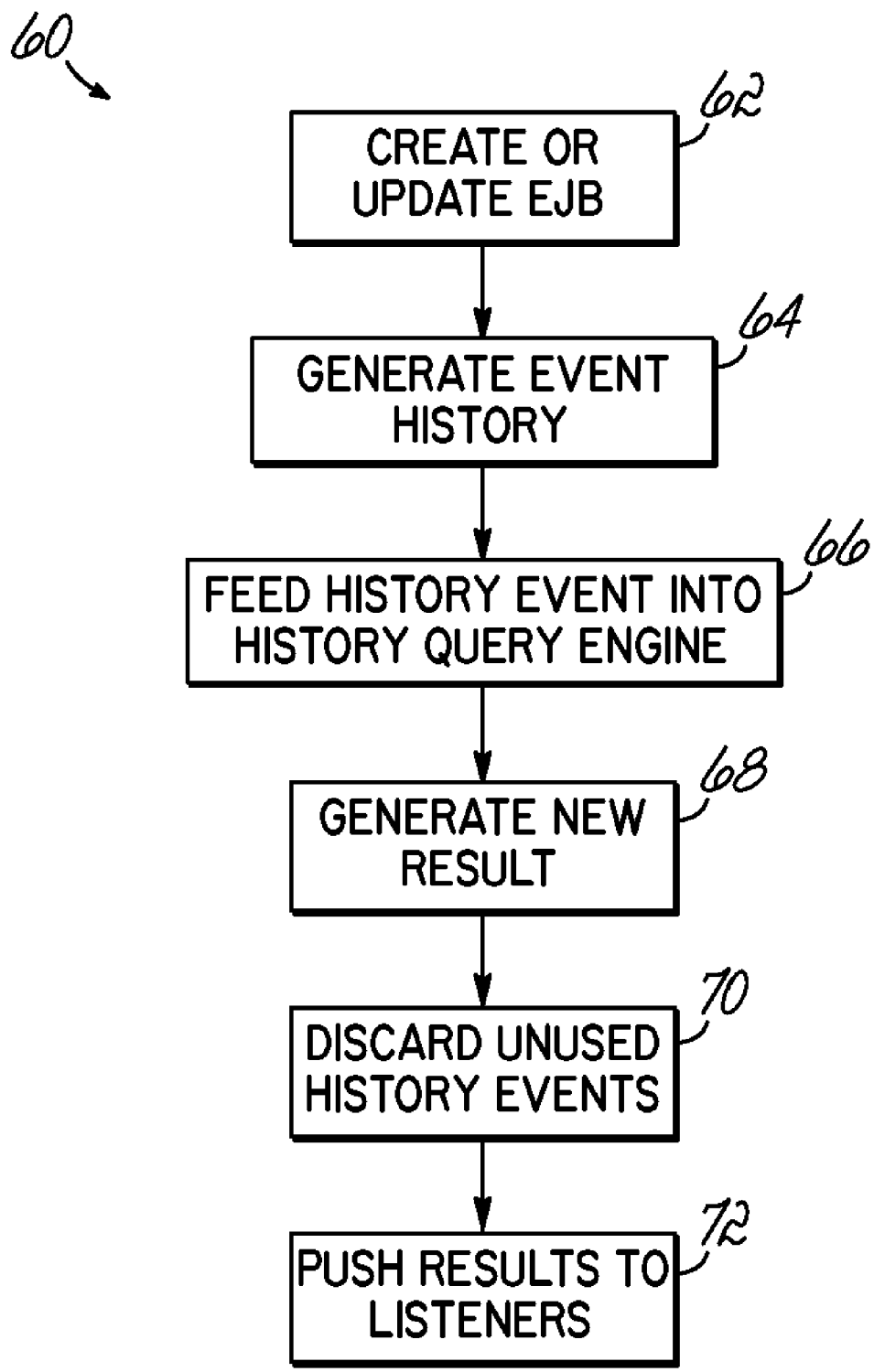
FIG. 3 shows a flowchart having steps executable by the system of FIG. 1 for querying historical data pertaining to an EJB in accordance with the principles of the present invention.

FIG. 3 shows a flowchart 60 having steps executable by the computer system 10 of FIG. 1 for querying historical data pertaining to an EJB 30 in accordance with the underlying principles of the present invention. Turning more particularly to the steps of the flowchart 60, the computer 10 may create, update or otherwise modify an EJB 30 at block 62 of FIG. 3.

The event adapter 36 may generate at block 64 a historical event in response to, for instance, an action affecting the EJB 30. The event information may be fed at block 66 into the history query engine 38. For instance, a query may be directed to a maximum CPU usage experienced over the time span of an hour. The event adapter 36 may generate one or more events, one of which corresponds to the highest level achieved of CPU usage during the hour. For instance, the highest level of CPU usage may have been 20% at 3:20 p.m.

The history engine 38 may generate at block 68 the new result, or requested historical data 44. For instance, the new result may include an output of "20% at 2:00 p.m." The history engine 38 may also discard histories at block 70 that will not be used in future queries. Consistent with embodiments of the invention, while no data may be available for the first hour or other time window of interest, any subsequent time window may be populated with usable event data. As shown at block 72 of FIG. 3, the historical data 44 may alternatively or additionally be pushed to listeners 40 associated with an EJB of interest.

In one example, a user may be interested in an average stock price over the time span of an hour. With the assistance of the program code, the user may write query language specifying the requested information. The query request may be configured in the deployment descriptor 32. The query plan 34 may generate an event adapter 36 and appropriate data structures/memory.

While the EJB 30 may include a current quote price of $110.00 at 2:00 p.m. The history query engine 38 may be scanned for other data used by the computer 10 in subsequent automatic calculations to determine the average stock price and/or other requested historical data 44.

As with the other flowcharts described herein, steps of the flowchart 60 may be augmented, omitted and/or eliminated in accordance with embodiments consistent with the underlying principles of the present invention.

In operation, embodiments consistent with the invention may provide a history query engine 38 coupled with a SQL-like syntax to allow users to query the history data. In one sense, when a history query is proposed to an EJB 30, embodiments may capitalize on event programming features to apply an event generator to EJB 30 practices for historical data mining.

Features of the present invention provide several benefits and advantages over conventional approaches. For instance, the historical data 44 may be kept in memory 18 and only that data that is needed for the query may be kept. If the historical data 44 is not used by any query, it may be automatically deleted, or never retrieved. There may also be no need to write a history bean or manage them. Moreover, the query syntax may provide selection, aggregation, projection, window and other operations so that a user may query the history of multiple entities, query a window data, etc.

In order to support the entity history query, several components may be employed. First, a query syntax may be used to support the history queries. Embodiments consistent with the invention may use a query syntax that may be similar to existing EJB query language, but may incorporate time semantics. The syntax may be similar to an event stream query. In one embodiment, the stream query syntax may be used in IBM's WebSphere ObjectGrid by incorporating the objects' semantics to support entity beans.

Second, embodiments may configure the history queries for entities. More particularly, the queries may be configured in the EJB deployment descriptor 32. For example, if a user wishes to find the average used memory percentage in the last minute using a predefined method, the user may configure the EJB deployment descriptor 32.

Third, embodiments may use an event adaptor 36 to adapt the entity data into the history event. An adaptor 36 may be used to convert the entity bean state to an event. That is, whenever an entity bean state is changed, the new state may be converted into events keyed by a time stamp.

In the above example, whenever the resource usage bean attribute is changed, an event (time, memory, CPU usage, etc.) may be created and fed into the history engine 38. The history engine 38 may be used to receive events from the entity bean state, and then to apply algorithms to these events to produce results. Exemplary algorithms may be configured to determine an average and/or a maximum value over a particular period, for instance. In the above example, the history engine 38 may receive the event, calculate the new average with the new data, and then update the new result.

Fourth, an embodiment may include a listener 40 attached to the EJB 30 to listen for changes of the history engine 38 output.

Embodiments of the present invention may only keep needed historical data 44. For instance, if a query request is only concerned with information over the course of an hour, any data older than an hour may be automatically discarded. This process may save available memory. Additionally, a user interface may provide user-friendly syntax that allows a user to automatically accomplish minimum, maximum, averaging and other statistical manipulations. The user may not have to deal at all with history entity beans. Rather, embodiments of the present invention look at events, a data structure hidden from the user.

While the present invention has been illustrated by a description of various embodiments and while these embodiments have been described in considerable detail, it is not the intention of the Applicant to restrict, or, in any way limit the scope of the appended claims to such detail. For instance, because the Java object-oriented computing environment is well understood and documented, many aspects of the invention have been described in terms of Java and Java-based concepts. However, the Java and Java-based concepts are used principally for ease of explanation. The invention is not limited to interactions with a Java object-oriented computing environment.

In another example, while embodiments of the invention lend themselves well for accommodating time-based queries, the principles of the underlying invention may apply equally to other measurable quantities that can be associated with an EJB. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. A computer method for conducting a query regarding an entity bean, comprising:
   receiving the query regarding the entity bean, including receiving user input requesting historical data associated with the entity bean that corresponds to a time window and a statistic, wherein the statistic is at least one of an average, minimum, or maximum, and wherein the statistic is determined without creating a history entity bean;
   receiving a query language definition for the query;
   parsing the query language definition into a query plan;
   generating an event adapter using the query plan, wherein the event adapter is configured to enable at least two of:
      generating event information according to the user input while the entity bean is executing, wherein generating the event information includes generating a plurality of events in response to a plurality of states of the entity bean, wherein each of the plurality of events includes a predefined action that affects the entity bean, and wherein each event includes an identifier indicative of a functionality associated with the entity bean and a time value;
      storing the event information in a memory; and
      deleting a portion of the event information based on the user input;
   using a history engine to automatically determine the historical data and the statistic from the event information, including performing a statistical operation corresponding to the statistic using the event information; and
   outputting the historical data.

2. The method of claim 1, further comprising communicating to a listener program at least one of the event information or the historical data.

3. The method of claim 1, further comprising using a deployment descriptor to configure the entity bean with a container option.

4. The method of claim 1, wherein the predefined action includes a user interaction with the entity bean.

5. The method of claim 1, further comprising configuring the query in a deployment descriptor.

6. The method of claim 1, wherein the query includes at least one of a selection operation, an aggregation operation, a projection operation, or a window operation.

7. The method of claim 1, further comprising using the query plan at a processor to generate the event information.

8. The method of claim 1, wherein the event adapter is generated at a deployment descriptor based on the user input.

9. The method of claim 1, further comprising using the event adapter to generate the historical data.

10. An apparatus, comprising:
    a memory;
    program code resident in the memory; and
    a processor in communication with the memory and configured to execute the program code to receive a query regarding an entity bean, including receive user input requesting historical data associated with the entity bean that corresponds to a time window and a statistic, wherein the statistic is at least one of an average, minimum, or maximum, and wherein the statistic is determined without creating a history entity bean, to receive a query language definition for the query, to parse the query language definition into a query plan, to generate an event adapter using the query plan, wherein the event adapter is configured to enable at least two of:
       generating event information according to the user input while the entity bean is executing, wherein generating the event information includes generating a plurality of events in response to a plurality of states of the entity bean, wherein each of the plurality of events includes a predefined action that affects the entity bean, and wherein each event includes an identifier indicative of a functionality associated with the entity bean and a time value,
       storing the event information in the memory, and
       deleting a portion of the event information based on the user input,
    using a history engine to automatically determine the historical data and the statistic from the event information, including performing a statistical operation corresponding to the statistic using the event information, and to output the historical data.

11. The apparatus of claim 10, wherein an event adapter is configured to generate the event information.

12. The apparatus of claim 10, wherein the predefined action includes a user interaction with the entity bean.

13. The apparatus of claim 10, wherein a deployment descriptor is used to configure the entity bean with a container option.

14. The apparatus of claim 10, wherein at least one of the event information and the historical data is communicated to a listener program.

15. The apparatus of claim 10, wherein the processor uses the query plan to generate the event information.

16. The apparatus of claim 10, wherein the event adapter is generated at a deployment descriptor based on the user input.

17. The apparatus of claim 10, wherein the event adapter is used to generate the historical data.

18. A program product, comprising:
    program code configured to receive a query regarding an entity bean, including receive user input requesting historical data associated with the entity bean that corresponds to a time window and a statistic, wherein the statistic is at least one of an average, minimum, or maximum, and wherein the statistic is determined without creating a history entity bean, to receive a query language definition for the query, to parse the query language definition into a query plan, to generate an event adapter using the query plan, wherein the event adapter is configured to enable at least two of:
       generating event information according to the user input while the entity bean is executing, wherein generating the event information includes generating a plurality of events in response to the a plurality of states of the entity bean, wherein each of the plurality of events includes a predefined action that affects the entity bean, and wherein each event includes an identifier indicative of a functionality associated with the entity bean and a time value,
       storing the event information in the memory, and
       deleting a portion of the event information based on the user input, using a history engine to automatically determine the historical data associated with the entity bean and the statistic from the stored event information, including performing a statistical operation corresponding to the statistic using the event information, and to output the historical data; and a non-transitory computer readable medium bearing the program code.

19. The program product of claim 18, wherein the query plan is used to generate the event information.

20. The program product of claim 18, wherein the event adapter is generated at a deployment descriptor based on the user input.

* * * * *